United States Patent [19]

Tangorra et al.

[11] Patent Number: 4,657,526
[45] Date of Patent: Apr. 14, 1987

[54] V-BELT

[75] Inventors: Giorgio Tangorra, Monza; Edoardo Robecchi, Sesto San Giovanni, both of Italy

[73] Assignee: Industrie Pirelli S.p.A., Milan, Italy

[21] Appl. No.: 780,092

[22] Filed: Sep. 25, 1985

[30] Foreign Application Priority Data

Sep. 27, 1984 [IT] Italy ................... 22869 A/84

[51] Int. Cl.⁴ .................................................. F16G 5/08
[52] U.S. Cl. ...................................... 474/261; 474/263
[58] Field of Search ............... 474/261, 263, 265, 260, 474/268

[56] References Cited

U.S. PATENT DOCUMENTS 3,416,383 12/1968 Jensen et al. ................ 474/261 X
3,992,958 11/1976 Bonnefon .................... 474/263 X
4,027,545 6/1977 White, Jr. ................... 474/263 X
4,571,230 2/1986 Woodland ................... 474/263 X

FOREIGN PATENT DOCUMENTS 0091947 6/1983 Japan .......................... 474/263

Primary Examiner—Stephen J. Novosad
Assistant Examiner—Thuy M. Bui
Attorney, Agent, or Firm—Stevens, Davis, Miller & Mosher

[57] ABSTRACT

V-belt of flexible polymeric material, in particular elastomeric material, comprising at least in the portion whose ends are destined to contact the pulley a plurality of layers, each one having fibers oriented in a single direction. The layers are alternately overlapped, some with the fibers oriented substantially in a longitudinal direction, the others oriented in a substantially transverse direction, the thickness of each layer being less or at most equal to the average length of the fibers present in the layer. Preferably, the V-belt is a cogged or toothed belt.

9 Claims, 5 Drawing Figures

V-BELT

DESCRIPTION

The present invention relates to a V-belt, and more particularly to the transverse and longitudinal reinforcing structure in a V-belt.

As is well known, a V-belt comprises an elastomeric body provided with an embedded resistant insert formed by a plurality of cords of flexible and inextensible material, coplanar and disposed in the longitudinal direction of the belt.

During operation, the transmission of motion between the belt and the pulleys is due to the adherence between a portion of the belt delimited by the flanks and the crown of the pulleys.

In many applications, the V-belt are not sufficiently rigid in the transverse sense and consequently suffer considerable deformations, thereby no longer assuring a long-lasting ratio of transmission. Moreover, the reduced transverse rigidity causes transverse deformations of the belt in the groove of the pulley, which greatly reduce the overall efficiency of the transmission.

Also, the insufficient transverse rigidity may bring about the serious drawback of an excessive absorption of power with overheating of the elastomeric material of the belt, and consequently a short fatigue life.

A solution to overcome the cited drawbacks consists in using a flexible polymeric material, generally an elastomeric material, having a very high hardness. However, in this case, the transverse hardness causes a stiffening in a transverse sense, but involves a degree of longitudinal adaptability of the belt to pulleys with small radii of curvature.

Moreover, it is possible to overcome this latter drawback by having recourse to providing cogs on the bottom of the belt, with the objective of producing improved flexibility and adaptation to pulleys with small radii of curvature.

However, in this case, further drawbacks are encountered since, the surface of contact with the pulley being reduced, it is possible that excessive pressures can occur in the contact between the belt flanks and the pulley flanks; said pressures are such as cannot be tolerated by the belt body.

One can have recourse to further solutions in order to overcome the cited drawbacks, and in particular to embed various materials in the elastomeric body of the belt and, at the same time, to provide the lower portion of the belt with suitable cogs. Nevertheless, in some applications they can cause a certain detachment among the contiguous materials inserted in the belt body and can lead to a shorter life of the belt.

It has also been suggested to resort to V-belts comprising fibers of textile or mineral material so as to stiffen transversely the part of the belt adapted to contact the pulley flanks.

However, in the known construction, it is found that the transverse stiffening produces an excessive stiffening in the longitudinal sense, introducing again also in this arrangement the previously cited drawback, i.e., a poor adaptability of the V-belt engaging pulleys characterized by small radii of curvature.

Moreover, there is also to be considered the fact that in the cited construction the embedding of the fibers is not always uniform throughout, as is desired for industrial use; in other words, it is not possible to determine correctly—or even experimentally—the more suitable conditions for a sure orientation of the fibers in particular directions as a function of the nature and/or properties of the elastomeric material.

The present invention is directed to a V-belt provided with a very high transverse rigidity adapted to avoid the wedging contact of the belt in the grooves of the pulley in the presence of stresses, without compromising the longitudinal flexibility necessary for allowing it to be wound on small radii of curvature, the whole so as to overcome all the drawbacks of the prior art by a solution which may be applied on a large industrial scale.

The object of the present invention is a V-belt comprising a body of polymeric flexible material, a plurality of longitudinal resistant inserts arranged in parallel to one another on a ring concentric with the belt and oriented according to the longitudinal direction of the belt, a portion of said body being delimited by flanks adapted to come into contact with corresponding surfaces of the grooves of a pulley in a transmission, said belt being characterized by the fact that at least said portion comprises a plurality of layers, each one with fibers oriented in a single direction, the layers being alternately overlapped with those having the fibers substantially oriented in longitudinal direction, and the others in a substantially transversal direction, the thickness of each layer with fibers being less or at most equal to the average length of the fibers present in the layer.

The term "average length of the fibers", as used herein is intended to denote that length which is determined by the greater number of fibers present in the layer and having a certain length value.

Consequently, the characteristic features of the invention are two.

The first characteristic feature is that relating to a plurality of layers of flexible polymeric material, in particular elastomeric material, overlapped with other layers having a different orientation.

In this embodiment, each layer comprises fibers oriented in a single direction so that on the whole all the layers determine a pre-arranged order to fibers having a substantially longitudinal direction with respect to the belt, alternating with fibers having a substantially transverse direction.

In practice, according to this first characteristic feature, there are originated, at least in the belt portion delimited by the flanks and adapted to come into contact with the pulley crown, networks in which the meshes of each network are formed by fibers, i.e., discontinuous elements, which are crossed and substantially at 90° with respect to one another.

The various overlapped networks thus created are of a high number, for instance, it is possible by have 20 to 30 overlapped layers, said layers being formed by bringing into juxtaposition raw elastomeric sheets embedding the fibers so as to form through the uncured adhesion a single layer of a desired thickness which is used as unfinished product for the formation of the belt and is subsequently shaped and stabilized in the cross-linking process of the elastomer during vulcanization of the belt.

The second characteristic feature is linked to the dimension of the thickness of each one of the single layers comprising fibers oriented in one or the other of the two main directions of the belt, the longitudinal direction or the transverse direction.

According to this second characteristic feature, the thickness of each layer has no particular value whatsoever, i.e., a purely random value, but it is closely linked to the value of the average length of the fibers embedded in the layer, i.e., the thickness of each layer is less or at most equal to the average length of the fibers.

The reasons why the combination of the two previously-cited characteristic features leads to overcoming of all the drawbacks of the past found in the conventional V-belts are not fully understood. Applicants can only supply some hypotheses, without however constituting any limitation on their invention.

The validity of the present solution of providing layers with fibers oriented in a first direction between two adjacent layers with fibers directed in the transverse direction to the first direction is seen in connection with the arising of the various stresses to which a V-belt may be subjected during the transmission of motion.

If, for instance, the belt should be arranged without altrenating layers having crossed fibers, but with the reinforcing fibers all oriented in the transverse direction in order to have a high rigidity in said direction and a high flexibility in the longitudinal direction, the desirable effects achieved by the present invention are not obtained.

In fact, the transverse compression exerted by the grooves of the pulleys during operation may be accompanied by deformations in the two radial and longitudinal directions, which tend to cause a "detachment" between the layers and the fibers, since the stresses in said directions should be borne by the sole elastomeric material.

Instead, the alternating layer arrangement permits a reduction in the deformations produced by the transverse compression stress, with a consequent increase in both the transverse rigidity of the belt and in its fatigue life.

This result, that apparently seems to be valid for any layer embedding fibers, cannot be achieved in practice when the thickness of the layer is greater with respect to the length of the fiber embedded within the layer.

In practice, it is found that providing a network arrangement among the fibers of contiguous planes, i.e., making the thickness thinner with respect to the length of each fiber, the conditions of mutual anchoring are improved; moreover, the most desirable result is also achieved by using the arrangement in which the thickness of the layers has values which are lower than one-half of the average length of the fibers.

A further explanation of the validity of the solution relating to the use of layer thicknesses, with values considerable lower or at most equal to the average length of the fibers embedded in each layer, may depend on the fact that with such thicknesses an undirectional orientation of the fibers themselves is obtained, very probably in the calendering steps by which the fibers are oriented in the elastomeric material; said unidirectional orientation appearing to result more favorably than that which may be obtained with thicknesses considerably greater, or at least greater than the length of the fibers themselves.

A still further possible explanation of the increase in belt resistance in the presence of the stresses required in use may be explained by the belting effect formed by the fibers, longitudinally directed with respect to the belt, with regard to the layers with fibers transversely directed and compressively loaded in contact with the groove of the pulley.

The present invention will be still better understood by the following detailed description, made by way of nonlimiting example with reference to the figures of the attached drawings, in which.

Figure 1:
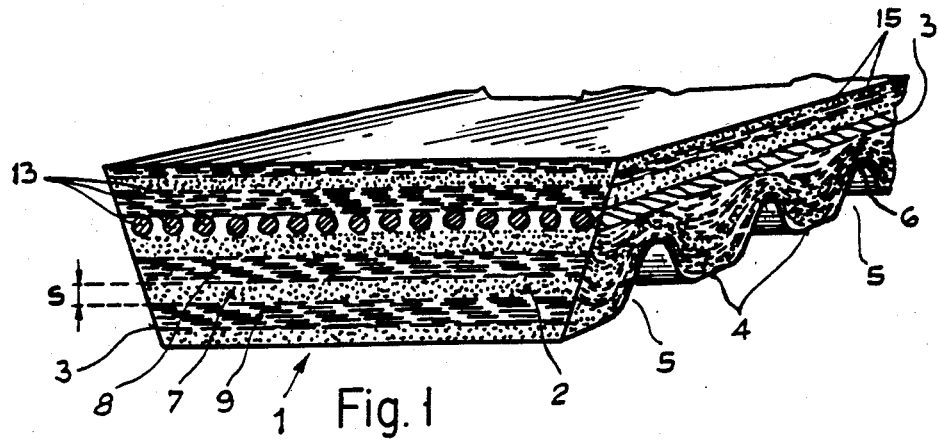
FIG. 1 is a partial perspective view of the belt according to this invention.

In FIG. 1, reference numeral 1 indicates a V-belt comprising a body of elastomeric material having a portion 2 delimited by flanks 3 adapted to contact corresponding surfaces of the groove of a pulley, and a cog or tooth arrangement in the lower part constituted by a plurality of teeth 4 alternating with spaces 5 disposed transversely with respect to the longitudinal direction of the belt and projecting from the inner (pulleycontacting) surface 6 of the belt.

The teeth 4 occupy substantially the belt portion delimted laterally by the flanks 3, adapted to come in contact with the flanks of the associated toothed pulley (not shown).

The portion 2 of the belt 1 comprises a plurality of elastomeric layers, with a hardness in some embodiments between 80 and 90 Shore A.

Each layer of the portion 2 embeds a plurality of fibers oriented in a single direction, i.e., substantially in the longitudinal direction or substantially in the transverse direction of the belt; the various layers of the portion 2 being intercalated between them so that whatever their number may be, any particular layer 7 with fibers oriented, for instance, in the longitudinal direction of the belt, is first joined with an adhesive and then chemically bound via a per se conventional crosslinking operation to two adjacent layers 8, 9, an upper one and a lower one, both having fibers oriented in the transverse direction.

The expression "substantially oriented according to the longitudinal and transverse direction of the belt", as used herein, is intended to indicate that the fibers embedded in any given layer may be inclined with angles between +5° and −5° with respect to the longitudinal direction of the belt, while in the layers adjacent to said layer the fibers are oriented with angles between 85° and 95°, always with respect to the longitudinal direction of the belt.

The fibers embedded in the layers may be of various types; in particular, a mineral material such as glass, or a textile material such as, for instance, the aramidic resins known as Kevlar, or a like substantially inextensible material such as nylon, polyester or rayon.

For the purpose of this invention, the layers of the portion 2 have also the essential peculiarity of a thickness linked to the maximum length of the fibers immersed in said thickness.

Figure 2:
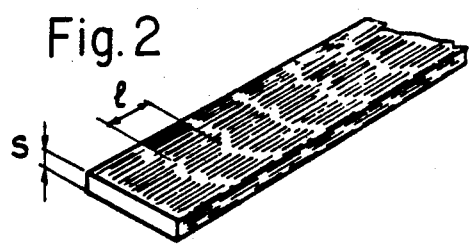
FIG. 2 shows the thickness of a layer embedding fibers as regards the length of one fiber.

According to the invention, the thickness s in any layer whatsoever (FIG. 2) is less than the average length 1 of the fibers, according to the formula:

$$s \leq 1.$$

Preferably, the thickness is less than one-half of the average length of the fibers.

The fibers have a length between 0.5 and 5 mm and a diameter between 10 μm and 400 μm.

In one particular example, by way of illustration, in which the fibers are of Kevlar with an average length $l=1.5$ mm, the thickness s is 0.4 mm.

In one of the possible embodiments, the belt above the portion 2 delimited by the flanks adapted to contact the pulleys, comprises a plurality of steel or Kevlar cords 13 (see FIG. 3), coplanar with respect to one another and directed in the longitudinal direction of the belt.

Also in a further embodiment, further layers 15 (FIG. 3) of elastomeric material embedding fibers disposed according to alternating layers, as in the underlying part, may be arranged above the cords 13.

Figure 3:
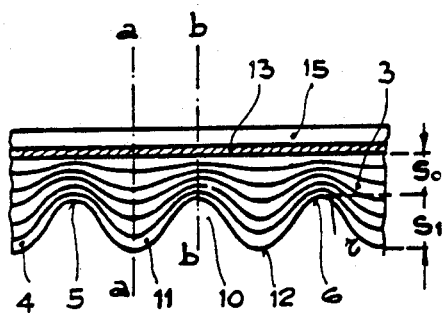
FIG. 3 is a further partial view of the belt of FIG. 1.

The layers, having the fibers oriented according to predetermined directions in the portion 2, assume a particular path in the vulcanized belt, as can be noted in the two transverse section planes 1-1 and b-b of the belt as shown in FIG. 3.

The height of the tooth varies from a minimum value $s_0$ in correspondence to the space 10 between the two teeth 11 and 12, to a maximum value $s_1$ in correspondence to the center line of the tooth.

As may be noted in FIG. 3, the "shaping" of the tooth during the molding process modifies the arrangement of the layers, making them assume a shape which becomes more and more like that of the tooth as the layers move away from the inner zone of the reinforcing cords 13 and come nearer the inner surface of the belt.

This occurs in consequence of the thinning of the layers in the intermediate zones between the teeth and in consequence of the thickening in the zones of the teeth. The elastomer forming the layers is thus eliminated from the thinning zones and inserted into the thickening zones, thus creating the final arrangement of the layers as shown in FIG. 3.

In order to avoid that besides the elastomer flow, there is also a movement of the fibers, the thickness $s_0$ should never be less than the value which is the product of the diameter of the fibers multiplied by the number of the layers.

According to the basic principle of this invention, the thickness of each layer in correspondence to the center line of the tooth is less than or at most equal to the average length of the fibers.

According to some examples, $s_0$ may lie between 5% and 20% of $s_1$.

As will be described more fully hereinafter, it is suitable to use an arrangement having a predetermined ratio between the width L at the root of each tooth, measured transversely with respect to the longitudinal direction of the belt, and the maximum height $s_1$ of the belt tooth projecting from the inner surface 6.

Preferably, the ratio $L:s_1$ is between 3 and 6.

According to a further advantageous arrangement, the ratio between the pitch p of the teeth and the depth of the space is 0.6 and 1.

In the cited embodiments, the space may have a trapezoidal or curvilinear profile. In case of a very deep space in some embodiments, a further improvement may be obtained by using a curvilinear profile and correlating the radius of curvature r of the space bottom to the depth.

In these cases, for belts having a certain rigidity, the ratio between the radius of the space bottom and the space depth is greater than 0.1; i.e., $r/s_1 > 0.1$.

In one of the many possible embodiments, the manufacturing process for making the present belt is carried out by having recourse to a building drum and to a conventional flat press for making the portion 2, comprising the various layers with fibers oriented in the two directions perpendicular to each other. The press, not shown, is provided with flat platens and comprises a first smooth platen and a second platen which can be toward or away from the first platen provided with toothing corresponding to that of the belt.

The platens are preferably provided with heating means. On the fixed platen, there are piled up the thin sheets of elastomeric material comprising the fibers oriented alternatively to thin sheets that have been subjected to a previous calendering carried out separately.

The pack of thin sheets is formed with a set of grooves and ribs corresponding to the belt teeth by bringing the platens near each other.

During the step of penetration of the mold ribs, the thickness of the material is reduced in correspondence to the spaces and, at the same time, the teeth are formed through compressive action, as shown in FIG. 3, relative to the finished belt.

The steps of the manufacturing process are further completed by positioning directly on the mold the unfinished product thus obtained and which corresponds to the portion 2 of the belt provided with the toothing.

Subsequently, on this unfinished product there are placed the wound cords 13 of steel, or of Kevlar, or of other less extensible material, and on said cords there are disposed the layers of the furthermost thin sheets.

Finally, the whole is subjected to a per se conventional vulcanizing process.

For the purposes of the results achieved by the various embodiments described above, the calendering step necessary for embedding the fibers into the elastomeric layers is of particular importance.

Surprisingly, it has been found to be decisive, for obtaining a suitable resistance, to calender the various sheets adapted to form the portion 2 of the belt with a thickess less or at most equal to the average length of the fibers embedded in each layer.

This invention, of which the previously cited figures constitute only various embodiments, permits one to obtain all the desired objectives.

First, the belts of the present invention have considerably improved performance on pulleys with reduced diameter. This result is rather unexpected, since it has been attained by using a plurality of reinforcing layers characterized by fibers oriented in the longitudinal direction, alternating with fibers oriented in the transverse direction.

It is found that a high belt flexibility, suitable for different heavy-duty applications, is also obtained with a large number of layers and reinforcing elements.

Figure 4A:
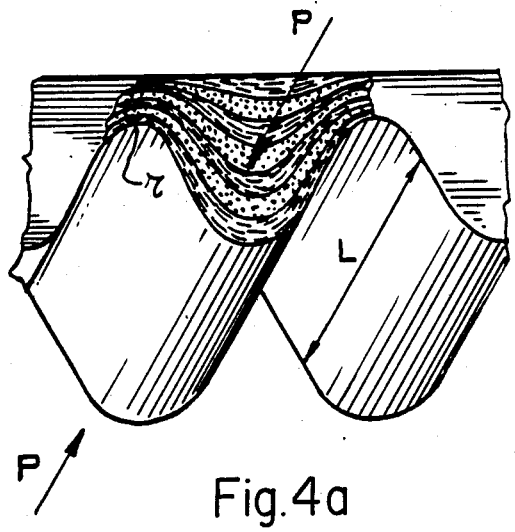
FIG. 4 shows at (a) a detail of the belt of FIG. 1 under load, and at (b) the equivalence between the tooth of the V-belt and a beam having a critical load at which an elastic buckling occurs.

Moreover, the transverse stability of the belt in the presence of compressive loads transmitted by the flanks of the pulley may reach the maximum in the present embodiments for the particular distribution of the layers with fibers, as shown in FIGS. 3 and 4a.

In fact, in the contact between the belt flanks and the pulley flanks, the tooth of width L and height $s_1$ would behave as a beam T, of height L and diameter $s_1$ (FIG. 4b) subjected to compressive loads P equivalent to the compressive thrust received on the flanks of the belt tooth.

Figure 4B:
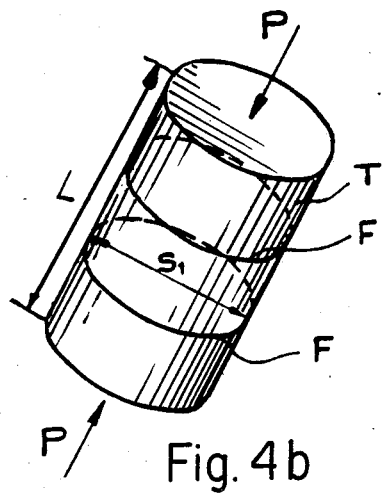

The reference numeral F in FIG. 4b indicates encircling elemens that, as known, are applied to increase the stability of the structure and to permit the application of loads P greater than those which normally could be safely applied if the said encircling elements were not present.

The presence of fibers oriented in the longitudinal direction in the alternate layers of the belt tooth produces an effect like that of the element F in the beam T. The increase in tooth stability toward the compressive stresses noted in the embodiments according to the present invention is thus explained.

In practice, said tooth has very reduced deformations and maintains thus its original configuration, since the compressive load P is absorbed by the layers comprising the transverse fibers and these latter in their turn are contained by the belting effect represented by the layers having longitudinal fibers.

Therefore, that which is essential for the purposes of the present invention is the face of having the fibers distributed in the predetermined and desired directions to obtain the more suitable resistances; i.e., in the longitudinal direction to provide the belting effect referred to before and in the transverse direction to absorb the compressive loads without swelling or distortion of the tooth subjected to the stresses.

This result is obtained by the characteristic feature of the thicknesses of the layers having values lower than the average length of the fibers so as to make certain the maintaining of the undirectional path of the fibers, since the calendering steps, i.e., the predisposition, where it is thought that the more important stresses to which the belt is subjected may really occur.

In combination with what has already been said, it is also valid, for the purposes of this invention and the resulting achieved stability, to have recourse to a choice of a ratio $L/s_1$ having the above-specified values. In other words, for a value of $s_1$ maintained within the previously-cited limits, there is obtained an enhanced dimensional stability for the tooth of width L.

Although some specific embodiments of the present invention have been illustrated and described, it is to be understood that the present invention includes within its scope other alternative embodiments readily apparent to a technician in this field; for instance, the invention also comprises a V-belt with a substantially hexagonal section, i.e., to a belt in which a substantially symmetrical portion of the belt is symmetrically overlapped with respect to the plane containing the cords 13 to a first part constituted as shown in FIG. 1.

The belt shown in FIG. 1 may be one of many similar belts placed side-by-side and constituting a single transmission element, i.e., a belt in which the upper part is connected to a flat portion and the lower parts are constituted by a plurality of belts separated by grooves that correspond to the grooves of a pulley having a plurality of grooves.

This invention comprises belts whose material embedding the fibers may be polyurethane or neoprene or a viscoelastomeric material, such as usually used in the transmission of motion between a belt and the relative pulleys.

What is claimed is:

1. A V-belt comprising a body of polymeric flexible material, a plurality of inextensible cords arranged in parallel to one another on a ring concentric with the belt and oriented according to the longitudinal direction of the belt, a portion of said body disposed below said cords being delimited by flanks adapted to contact corresponding surfaces of the groove of a pulley in a transmission system, said belt being characterized in that at least said portion comprises a plurality of layers, each layer having fibers oriented in a single direction, the layers alternatively overlapping with one layer having fibers substantially oriented in the longitudinal direction, and another layer having fibers oriented in a substantially transverse direction, said plurality of layers comprising a first layer with fibers oriented in one of said longitudinal direction and a direction substantially transverse to said longitudinal direction, said first layer being sandwiched between and bonded with two adjacent layers both having fibers oriented in the other of said longitudinal direction and said direction substantially transverse to said longitudinal direction, the thickness of each layer being less than or at most equal to the average length of the fibers present in the layer.

2. A V-belt as defined in claim 1, characterized in that the thickness of the layer comprising fibers oriented in one direction is less or at most equal to one-half of the average length of the fibers immersed in said layer.

3. A V-belt as defined in claim 1, characterized in comprising a plurality of teeth arranged transversely with respect to the longitudinal direction of the belt in said portion delimited by flanks, said layers in correspondence to said teeth having a greater thickness with respect to the layers arranged in the remaining part of the belt.

4. A V-belt as defined in claim 3, characterized in that the thickness of the layers in correspondence to the center line between two teeth varies between 5% and 20% of the thickness of the layers themselves in correspondence to the tooth center line, said thickness being measured in planes perpendicular to the longitudinal direction of the belt.

5. A V-belt as defined in claim 3, characterized in that the ratio between the width of each tooth measured at the root of the tooth transversely to the longitudinal direction of the belt and the height of the tooth projecting from the inner surface of the belt is in the range between 3 and 6.

6. A V-belt as defined in claim 1, characterized in that the ratio between the pitch of the teeth and the depth of the space between the teeth is betweem 0.6 and 1.

7. A V-belt as defined in claim 6, characterized in that the space has a cuvilinear profile and the ratio between the radius of curvature of the space and the depth of the space is greater than 0.1.

8. A V-belt as defined in any one of claims 1 to 7, characterized in comprising a plurality of inextensible cords coplanar with respect to one another and oriented in the longitudinal direction of the belt in a position immediately over said portion delimited by flanks adapted to contact the associated pulley.

9. A V-belt as defined in claim 8, in that layers of flexible polymeric material with fibers oriented in a single direction are disposed over said cords, the layers being overlapped alternately with respect to those having the fibers oriented substantially in the longitudinal direction, the fibers of the other layers being in substantially transverse direction, the thickness of each layer being less than or at most equal to the average length of the fibers embedded in each of said layers.

* * * * *